No. 608,028. Patented July 26, 1898.
A. C. J. CHARLIER.
PROCESS OF MANUFACTURING LEAD SULFITE.
(Application filed June 5, 1897.)
(No Model.)
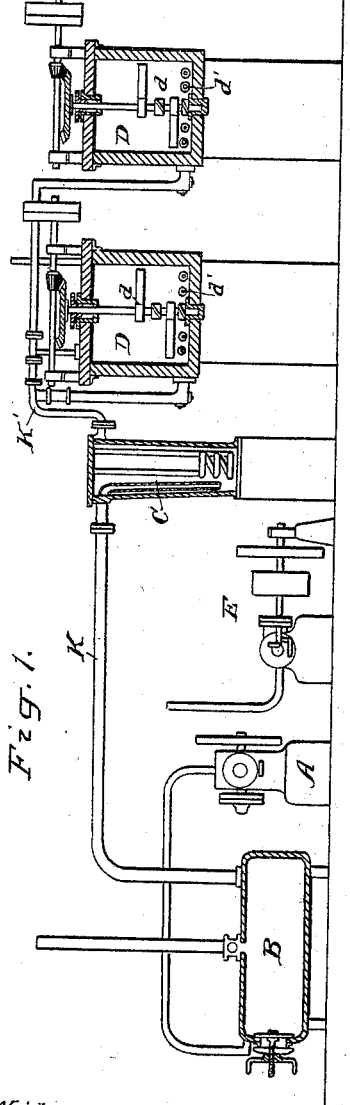
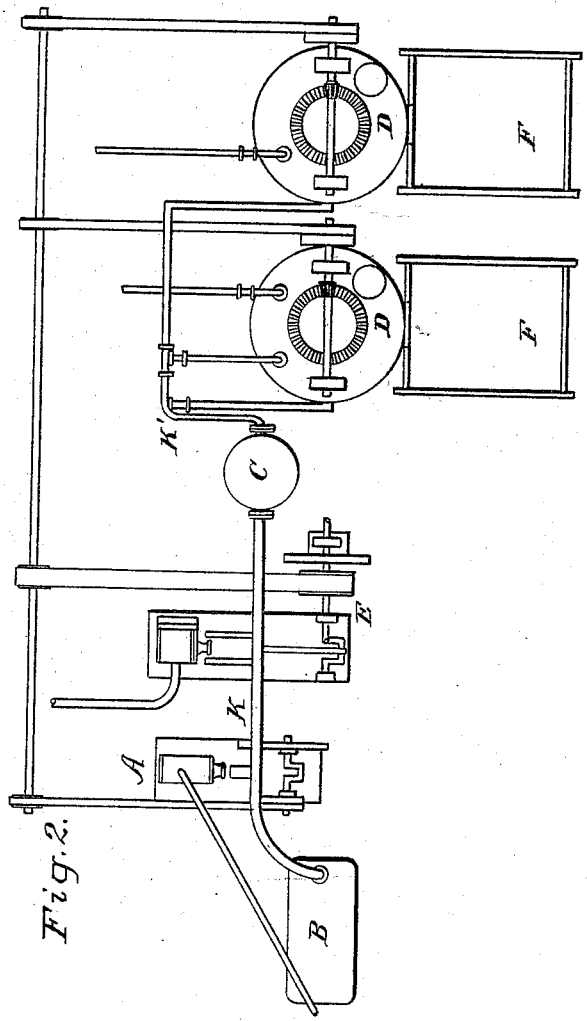

UNITED STATES PATENT OFFICE.

ANDREW CHARLES JOSEPH CHARLIER, OF GLASGOW, SCOTLAND.

PROCESS OF MANUFACTURING LEAD SULFITE.

SPECIFICATION forming part of Letters Patent No. 608,028, dated July 26, 1898.

Application filed June 5, 1897. Serial No. 639,498. (No specimens.)

*To all whom it may concern:*

Be it known that I, ANDREW CHARLES JOSEPH CHARLIER, a subject of the Queen of Great Britain and Ireland, residing at Glasgow, Scotland, have invented a new and Improved Process for the Manufacture of Lead Sulfite, of which the following is a specification.

This invention relates to the conversion of oxid of lead into neutral or basic sulfite of lead, thus forming white lead suitable for use as a pigment.

White lead, as known to the trade, consists of hydrate of lead, carbonate of lead, or sulfate of lead; but by this process a sulfite is, under certain conditions mentioned below, formed into a white lead which, while being non-poisonous, contains more covering power and body as a pigment than any other white lead at present manufactured.

In the accompanying drawings, which form a part of this specification, Figure 1 is a sectional view of an apparatus for carrying out my invention, and Fig. 2 is a plan view thereof.

The apparatus used comprises several air-tight covered vats D, arranged in a series, fitted, when necessary, with agitators $d$ and also steam-coils $d'$. Into these vats finely-ground oxid of lead, by which I mean the monoxid PbO, is placed after being mixed into a paste with water, which may or may not be slightly acidified with acetic or other suitable acid, according to the quality of the oxid of lead employed in the manufacture of the white sulfite of lead. The use of this slight proportion of acid has, however, no bearing on the process itself and is unnecessary when the oxid is sufficiently pure.

In connection with the vats is a furnace B for burning sulfur or other compounds of sulfur which will produce, when burning in conjunction with air, sulfur-dioxid gas $SO_2$.

An air-pump A is connected with the furnace, which keeps it continuously supplied with the requisite amount of air necessary for the burning sulfur to combine with the oxygen of the air and form $SO_2$, or sulfur-dioxid gas.

E represents an engine connected to the air-pump and the agitators in any suitable manner so as to operate same. The gas is then passed from furnace B by pipe K through a washer C to free it from all impurities, and the pure gas then passes by pipe K' to the vats containing the oxid of lead and at once converting PbO into $PbSO_3PbO$, or basic sulfite of lead, or if the action is continued long enough into $PbSO_3$, or sulfite of lead.

The whole apparatus is worked under a pressure of ten to twenty pounds to the square inch, and the proper degree of temperature being obtained by the use of steam-coils in the converting-vats and the sulfur-dioxid gas being washed free from all impurities before acting upon the oxid of lead the latter is easily converted into sulfite of lead, which may be neutral or basic, according to the quantity of sulfur dioxid passed into the lead, and the resulting compound forms a white lead suitable for use as a pigment. The compound thus formed may be fully washed in the washing-tanks F.

Having thus described my invention, what I claim as new, and desire to secure by Letters Patent, is—

The process of preparing basic sulfite of lead for use in pigments, consisting in passing sulfur-dioxid gas into a paste or mixture of water and oxid of lead.

ANDREW CHARLES JOSEPH CHARLIER.

Witnesses:
    JAMES YATE JOHNSON,
    WALTER WATSON.